US007860456B2

(12) United States Patent
Kim

(10) Patent No.: US 7,860,456 B2
(45) Date of Patent: Dec. 28, 2010

(54) METHOD AND APPARATUS FOR SECURED COMMUNICATION BETWEEN BLUETOOTH® DEVICES

(75) Inventor: Sang-Don Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 660 days.

(21) Appl. No.: 11/704,146

(22) Filed: Feb. 8, 2007

(65) Prior Publication Data

US 2007/0202806 A1 Aug. 30, 2007

(30) Foreign Application Priority Data

Feb. 8, 2006 (KR) .................. 10-2006-0012293

(51) Int. Cl.
*H04B 7/00* (2006.01)
(52) U.S. Cl. ..................... 455/41.2; 455/41.3
(58) Field of Classification Search ........... 455/41.2, 455/41.3, 461, 551; 370/465
See application file for complete search history.

(56) References Cited

U.S. PATENT DOCUMENTS

2002/0131445 A1  9/2002  Skubic et al.

FOREIGN PATENT DOCUMENTS

| CN | 1489339 | 4/2004 |
|---|---|---|
| EP | 1 379 029 | 1/2004 |
| KR | 1020020089742 | 11/2002 |

OTHER PUBLICATIONS

Tian Xinjian, "To Discuss of the Security Mechanism in Bluetooth", Jun. 15, 2004.

*Primary Examiner*—Eugene Yun
(74) *Attorney, Agent, or Firm*—The Farrell Law Firm, LLP

(57) ABSTRACT

Provided is a method and apparatus for secured communication between Bluetooth devices. A temporary Bluetooth Device Address (BD_ADDR) is generated and set if a Bluetooth communication request is generated in a secured mode and Bluetooth communication is performed using the temporary BD_ADDR; when the Bluetooth communication is terminated, the temporary BD_ADDR is released and eliminated and a default BD_ADDR is set. Thus, it is possible to prevent another Bluetooth device from performing the Bluetooth communication without a bonding process, thereby enabling secured communication.

10 Claims, 4 Drawing Sheets

METHOD AND APPARATUS FOR SECURED COMMUNICATION BETWEEN BLUETOOTH® DEVICES

PRIORITY

This application claims priority under 35 U.S.C. §119 to an application entitled "Method and Apparatus for Secured Communication between Bluetooth® Devices" filed in the Korean Intellectual Property Office on Feb. 8, 2006 and assigned Serial No. 2006-12293, the contents of which are incorporated herein by reference.

BACKGROUND OF THE INVENTION

1. Field of the Invention

The present invention generally relates to Bluetooth® (hereinafter "Bluetooth") communication, and in particular, to a Bluetooth secured communication method and apparatus.

2. Description of the Related Art

Bluetooth is a standard that is designed to support low-cost, short-range wireless communication between mobile devices such as portable PCs and portable telephones. Bluetooth uses radio frequencies in the 2.45 GHz Industrial Scientific Medical (ISM) band, which does not require a wireless license, thereby enabling various digital devices to exchange voice and data with each other completely without any physical connection. For instance, Bluetooth wireless technology may be employed in a portable telephone and a laptop computer so that they can communicate with each other without a cable. Also, a Bluetooth system may be incorporated in all digital devices, such as a Personal Digital Assistant (PDA), a desktop computer, a fax, a keyboard and a joystick.

FIG. 1 is a diagram illustrating general communication between Bluetooth devices. The Bluetooth devices refer to digital devices including Bluetooth modules for Bluetooth communication. A user terminal 100 containing a Bluetooth module establishes a wireless connection with adjacent Bluetooth devices 110 to 150; the terminal supports point-to-point connection and point-to-multipoint connection. When the user terminal 100 performs detection of a Bluetooth device, information about the adjacent Bluetooth devices 110 to 150 is displayed on the user terminal 100. Then, the user terminal 100 starts a connection set-up procedure for connecting the user terminal 100 to a desired device from among the detected Bluetooth devices. In this case, the user terminal 100 requesting the connection to another Bluetooth device is called a "master device", and the counterpart Bluetooth device receiving the connection request is called a "slave device". The master-slave relationship may change after the connection set up.

For example, when Bluetooth cellular phones are communicating, a connection between the Bluetooth cellular phones is essential for phone data exchange or a call in a walkie-talkie mode. In order to establish a wireless connection between two Bluetooth devices, an authentication procedure called "pairing" between the devices must be performed. That is, a first device, to allow a connection thereto, must be operating in an inquiry scan mode or a page scan mode. A second device, in order to attempt a connection to the first device, must send an inquiry message including its Bluetooth Device Address (BD_ADDR) through a user interface so as to find a counterpart device located in proximity to the second device. The Bluetooth device receiving the inquiry message sends an inquiry response message including its BD_ADDR to a corresponding Bluetooth device. The Bluetooth device receiving the inquiry response message displays Bluetooth devices corresponding to the inquiry response message and attempts a connection to a device selected by a user.

In the pairing procedure, the master device presents a Personal Identification Number (PIN) code window to a user to request a PIN code corresponding to a device to be connected. If the master device attempts a connection after the PIN code is entered, the slave device also presents a window requesting a PIN code. At this time, if a user of the slave device enters the same PIN code as the PIN code that is entered by one who attempts the connection, the two devices exchange a link key using the input PIN code, BD_ADDR and a random number (RAND) to/from each other.

The link key is provided to the two Bluetooth devices for use in the authentication procedure between the two Bluetooth devices. However, the link key must be used only for a connection between the two Bluetooth devices.

As such, in searching, pairing, authentication, and connection between two Bluetooth devices, BD_ADDR of each of the Bluetooth devices should be used. The two Bluetooth devices store each other's BD_ADDR without elimination even after termination of a Bluetooth communication, and thus a Bluetooth connection between the two Bluetooth devices is possible after completion of the bonding process.

As a result, a serious security problem occurs in a Bluetooth communication. In other words, after completion of the bonding process, a Bluetooth device of a user may be connected to another Bluetooth device without user's recognition and unintentional information leakage may occur. In particular, although one-time transmission/reception of data like image files is executed through Bluetooth communication, bonding data such as BD_ADDR remains without being eliminated constituting a fatal blow to communication security.

SUMMARY OF THE INVENTION

It is, therefore, an object of the present invention to provide a method and apparatus for secured communication between Bluetooth devices.

It is another object of the present invention to provide a method and apparatus for secured communication between Bluetooth devices, in which each other's remaining bonding information becomes invalid after termination of a Bluetooth communication.

According to one aspect of the present invention, there is provided a method for secured communication between Bluetooth devices. The method includes generating and setting a temporary Bluetooth Device Address (BD_ADDR) if a Bluetooth communication request is generated in a secured mode, performing the Bluetooth communication using the temporary BD_ADDR, releasing and eliminating the temporary BD_ADDR and setting the default BD_ADDR when the Bluetooth communication is terminated.

According to another aspect of the present invention, there is provided an apparatus for secured communication between Bluetooth devices. The apparatus includes a Bluetooth module for performing Bluetooth communication using a set of Bluetooth Device Addresses (BD_ADDR) and a controller for generating and setting a temporary BD_ADDR when a secured Bluetooth communication is requested, releasing and eliminating the temporary BD_ADDR and setting the default BD_ADDR when the Bluetooth communication is terminated.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, detailed description of known functions and configurations incorporated is omitted for conciseness.

The structures of Bluetooth devices according to the present invention will now be described with reference to FIG. 2. The Bluetooth device refers to a digital device containing a Bluetooth module for Bluetooth communication. For example, the Bluetooth device may include general digital devices containing a Bluetooth module, such as a Personal Digital Assistant (PDA), a desktop computer, a fax, a keyboard and a joystick.

Figure 1:
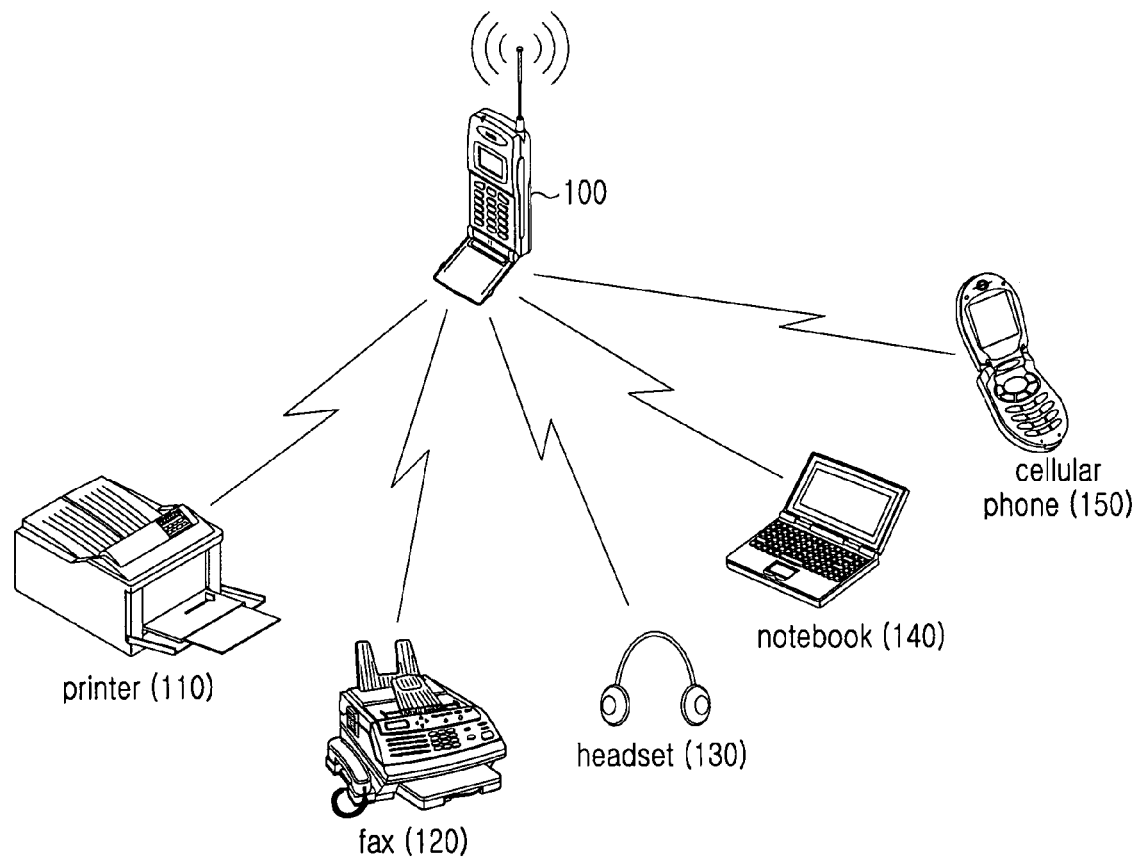
FIG. 1 is a diagram illustrating a general communication method between Bluetooth devices.
Figure 2:
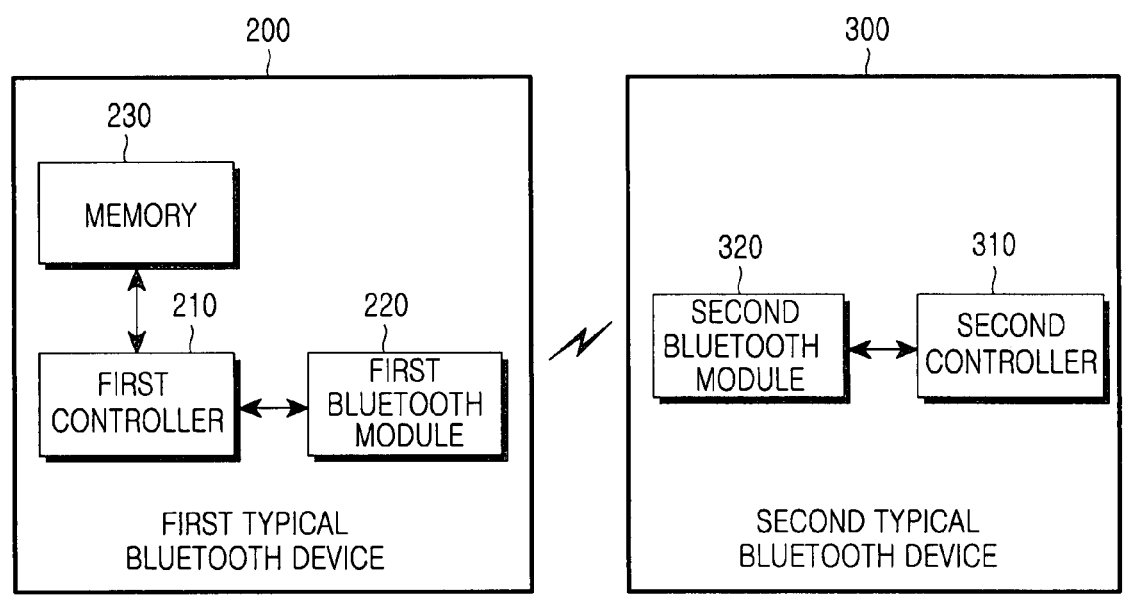
FIG. 2 is a block diagram of Bluetooth devices according to the present invention.

In FIG. 2, the structures of typical Bluetooth devices are shown: a first Bluetooth device 200 and a second Bluetooth device 300. The two devices are performing a Bluetooth communication. In the following description, it is assumed that the first Bluetooth device 200 initiates the Bluetooth communication, i.e., a master device, and the second Bluetooth device 300 is the target device i.e., a slave device that receives a Bluetooth communication request. The first Bluetooth device 200 may be a digital terminal that operates as a master device, such as a cellular phone or a desktop computer, and the second Bluetooth device 300 may be a peripheral device that operates as a slave, such as a keyboard, a monitor, or a wireless headset.

Referring to FIG. 2, the first Bluetooth device 200 includes a first controller 210, a first Bluetooth module 220, and a memory 230.

The first Bluetooth module 220 performs Bluetooth communication with other Bluetooth devices under the control of the first controller 210, thereby allowing exchange of radio signals between the first controller 210 and other Bluetooth devices.

The memory 230 stores programs for processing and control operations of the first controller 210, reference data, reserved data that can be updated, and various kinds of multimedia data and is used as a working memory of the first controller 210.

The first controller 210 controls the overall operation of the first Bluetooth device 200 and controls the operation of the Bluetooth module 220 according to user's key input. If a secured Bluetooth communication is requested according to an embodiment of the present invention, the first controller 210 generates a temporary Bluetooth Device Address (BD_ADDR) and performs a control operation such that the Bluetooth module 220 uses the temporary BD_ADDR for the Bluetooth communication. The Bluetooth communication request is regarded as being generated both when the first Bluetooth device 200 is set to a master device according to user's selection and when the first Bluetooth device 200 is set to a slave device by another Bluetooth device. After termination of the Bluetooth communication, the controller 210 releases and eliminates the set temporary BD_ADDR and sets the default BD_ADDR. It is a unique BD_ADDR assigned to each Bluetooth device.

The second Bluetooth device 300 includes a second controller 310 and a second Bluetooth module 320.

The second controller 310 controls the overall operation of the second Bluetooth device 300 and controls the operation of the second Bluetooth module 320 according to user's key input.

The second Bluetooth module 320 performs a Bluetooth communication with other Bluetooth devices under the control of the second controller 310, thereby allowing exchange of radio signals between the second controller 310 and other Bluetooth devices.

Figure 3A:
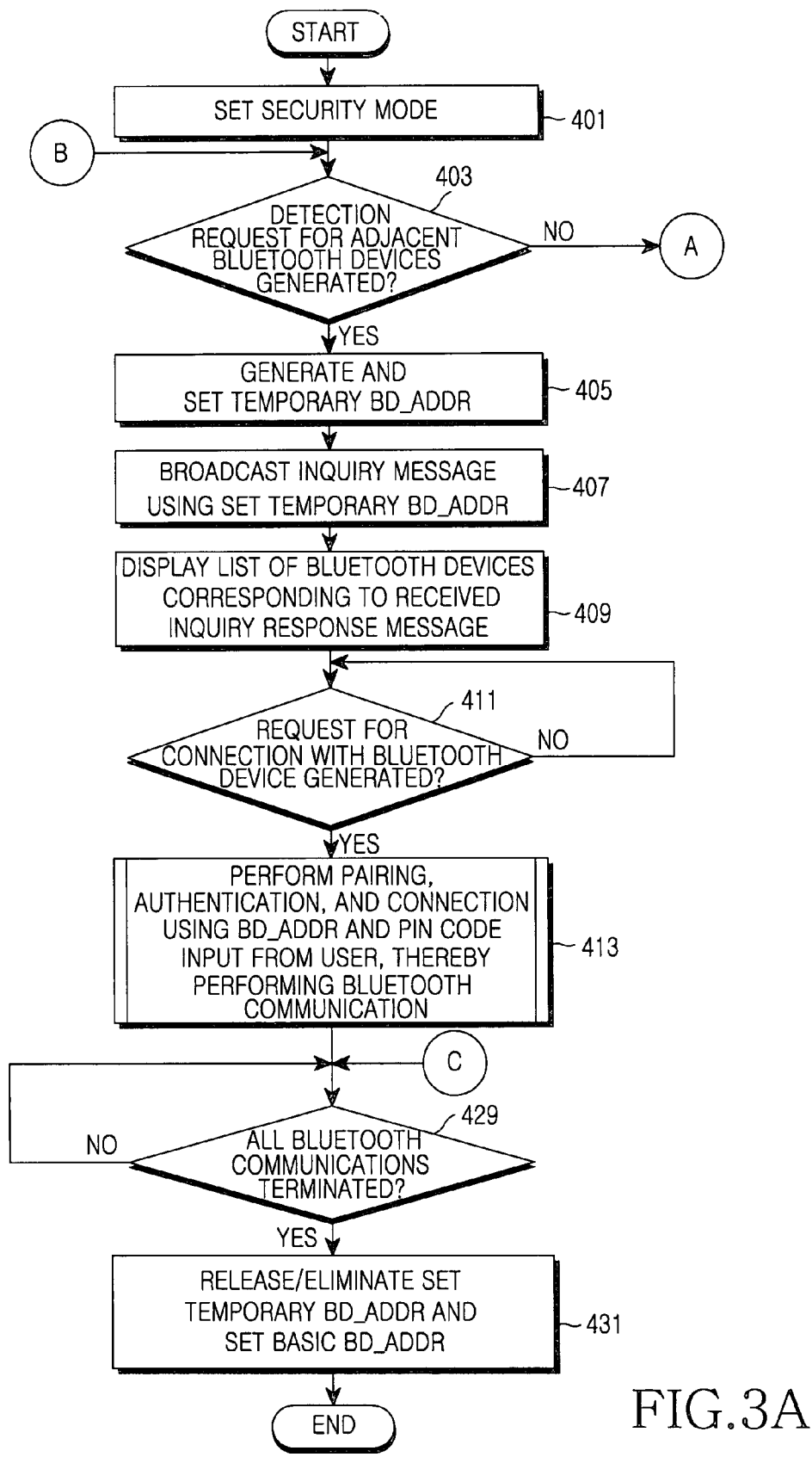
FIGS. 3A and 3B are flowcharts illustrating operations of a Bluetooth device according to the present invention.
Figure 3B:
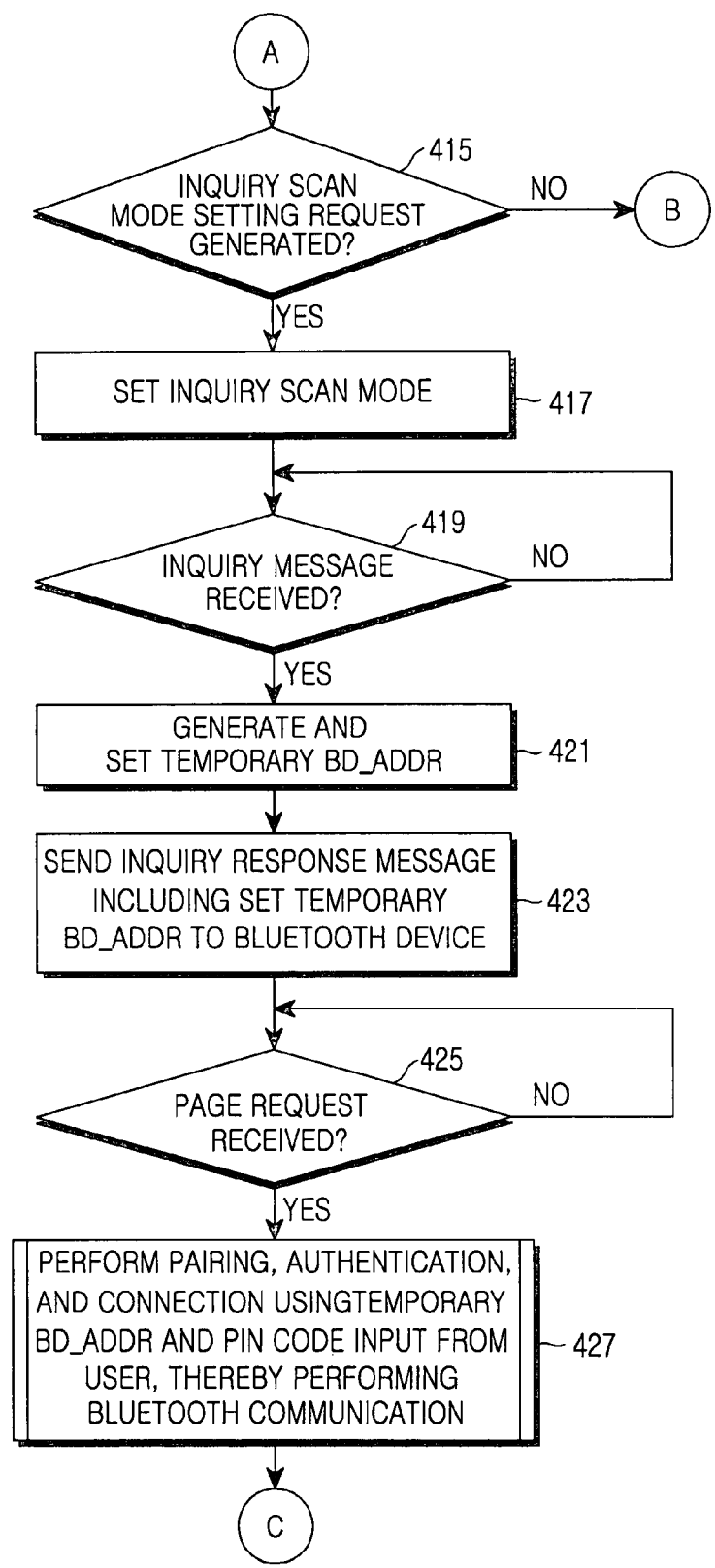

The operations of the first Bluetooth device 200 according to the present invention are shown in FIGS. 3A and 3B. In FIG. 3A, the first Bluetooth device 200 attempts a Bluetooth communication with another Bluetooth device. In FIG. 3B, a Bluetooth device attempts a Bluetooth communication with the first Bluetooth device 200.

Referring to FIGS. 3A and 3B, if a detection request for adjacent Bluetooth devices is generated from a user in step 405, after the first Bluetooth device 200 goes into secure mode at the user's request in step 401, the first Bluetooth device 200 goes to step 407. In other words, the user requests detection of adjacent Bluetooth devices for a Bluetooth communication with another Bluetooth device. The first Bluetooth device 200 generates a temporary BD_ADDR for use in the Bluetooth communication. In step 407, the first Bluetooth device 200 broadcasts an inquiry message including the set temporary BD_ADDR. At this time, the generated temporary BD_ADDR should not be the same as the default BD_ADDR of an adjacent Bluetooth device. If the generated temporary BD ADDR is the same as the default BD_ADDR of an adjacent Bluetooth device, the first Bluetooth device 200 notifies the user of the occurrence of an error and stops the Bluetooth communication. The temporary BD_ADDR is different every time. Upon receiving an inquiry response message from Bluetooth devices in step 409, the first Bluetooth device 200 displays a list of Bluetooth devices corresponding to the received inquiry response message in step 409. The user selects a Bluetooth device to be connected to the first Bluetooth device 200, e.g., the second Bluetooth device 300, from the displayed list and inputs a connection request. The first Bluetooth device 200 senses the user's connection request in step 411 and goes to step 413. The first Bluetooth device 200 performs pairing, authentication, and connection using the BD_ADDR of the selected Bluetooth device and a PIN code input from the user, thereby performing a Bluetooth communication in step 413.

If the user requests termination for all Bluetooth communications in step 429, the first Bluetooth device 200 goes to step 431 to terminate the Bluetooth communications, releases and eliminates the set temporary BD_ADDR, sets the default BD_ADDR, and goes to step 403. In other words, because Bluetooth communication supports point-to-multipoint communication, if Bluetooth communications are performed with two or more Bluetooth devices when the temporary BD_ADDR is already generated and set, all the Bluetooth communications are performed using the set temporary BD_ADDR. In addition, since Bluetooth communications can be performed with a plurality of Bluetooth devices using the temporary BD_ADDR, the set temporary BD_ADDR is released and eliminated if all the Bluetooth communications using the temporary BD_ADDR are terminated.

As such, according to the present invention, if a request for connection with another Bluetooth device is generated when a security mode is set, a temporary BD_ADDR is generated and set for a Bluetooth communication. Once the Bluetooth communication is terminated, the set temporary BD_ADDR is released and the default BD_ADDR is set, thereby preventing another Bluetooth device from performing the Bluetooth communication without the bonding process.

Referring to FIG. 3B, if the user requests an inquiry scan mode in a secured mode in step 415, the first Bluetooth device 200 goes to step 417 to set the inquiry scan mode and then goes to step 419. If an inquiry message from another Bluetooth device is received, e.g., the second Bluetooth device 300 in step 419, the first Bluetooth device 200 goes to step 421. The first Bluetooth 200 generates and sets a temporary BD_ADDR in step 421 and goes to step 423. The first Bluetooth device 200 sends an inquiry response message including the set temporary BD_ADDR to the Bluetooth device and goes to step 425. Upon receiving a page request from the Bluetooth device in step 425, the first Bluetooth device 200 goes to step 427 to perform pairing, authentication, and connection using the temporary BD_ADDR and a PIN code input from the user, thereby performing a Bluetooth communication. The first Bluetooth device 200 then goes to C to perform step 429 of FIG. 3A.

If the user requests termination for all Bluetooth communications in step 429, the first Bluetooth device 200 goes to step 413 to terminate the Bluetooth communications, releases and eliminates the set temporary BD_ADDR, sets the default BD_ADDR, and goes to step 403. In other words, because a Bluetooth communication supports point-to-multipoint communication, if Bluetooth communications are performed with two or more Bluetooth devices when the temporary BD_ADDR is already generated and set, all the Bluetooth communications are performed using that temporary BD_ADDR. In addition, since Bluetooth communications can be performed with a plurality of Bluetooth devices using the temporary BD_ADDR, the set temporary BD_ADDR is released and eliminated if all Bluetooth communications using the temporary BD_ADDR are terminated.

As such, according to the present invention, if a request for connection with another Bluetooth device is generated in a secured mode, a temporary BD_ADDR is generated and set for a Bluetooth communication. Once the Bluetooth communication is terminated, the set temporary BD_ADDR is released and the default BD_ADDR is set, thereby preventing another Bluetooth device from performing the Bluetooth communication without the bonding process.

While the present invention has been shown and described with reference to a preferred embodiment thereof, it will be understood by those skilled in the art that modifications may be made therein without departing from the spirit and scope of the invention. For example, a profile application previously used by a Bluetooth device to perform a Bluetooth communication may be remembered such that a temporary BD_ADDR is generated and set only when a specific profile application, e.g., an Object Push Profile (OPP), a Serial Port Profile (SPP), and a File Transfer Profile (FTP), is used for the Bluetooth communication.

What is claimed:

1. A method for secured communication between Bluetooth devices, the method comprising:

generating and setting a first temporary Bluetooth Device Address (BD_ADDR), if a detection request for adjacent Bluetooth devices is requested from a user in a secured mode;

broadcasting an inquiry message including the first temporary BD_ADDR;

performing Bluetooth communication with a Bluetooth device selected by the user from among Bluetooth devices corresponding to a received inquiry response message using the first temporary BD_ADDR; and releasing and eliminating the first temporary BD_ADDR and setting a default BD_ADDR, when the Bluetooth communication is terminated.

2. The method of claim 1, further comprising:

setting an inquiry scan mode in the secured mode;

upon receiving an inquiry message from a Bluetooth device, generating and setting a second temporary BD_ADDR and sending an inquiry response message including the second temporary BD_ADDR;

upon receiving a page request from the Bluetooth device, performing a Bluetooth communication using the second temporary BD_ADDR; and releasing and eliminating the second temporary BD_ADDR and setting the default BD ADDR when the Bluetooth communication is terminated.

3. The method of claim 1, wherein, if a plurality of Bluetooth devices perform Bluetooth communications with the Bluetooth device using the first temporary BD_ADDR, the first temporary BD_ADDR is released and eliminated and the default BD_ADDR is set after all the Bluetooth communications with the plurality of Bluetooth devices are terminated.

4. The method of claim 2, wherein, if a plurality of Bluetooth devices perform Bluetooth communications with the Bluetooth device using the second temporary BD_ADDR, the second temporary BD_ADDR is released and eliminated and the default BD_ADDR is set after all the Bluetooth communications with the plurality of Bluetooth devices are terminated.

5. The method of claim 1, wherein the default BD_ADDR is a unique address assigned to the Bluetooth device.

6. An apparatus for secured communication between Bluetooth devices, the apparatus comprising:

a Bluetooth module for performing a Bluetooth communication using a set Bluetooth Device Address (BD_ADDR); and a controller for generating and setting a temporary BD_ADDR if a Bluetooth communication request is generated in a secured mode, and releasing and eliminating the temporary BD_ADDR and setting a default BD_ADDR when the Bluetooth communication is terminated, wherein the controller generates and sets a first temporary BD_ADDR, if a detection request for adjacent Bluetooth devices is requested from a user in the secured mode, and releases and eliminates the first temporary BD_ADDR and sets the default BD_ADDR, when the Bluetooth communication is terminated, and wherein the Bluetooth module broadcasts an inquiry message including the first temporary BD_ADDR and performs the Bluetooth communication with a Bluetooth device selected by the user from among Bluetooth devices corresponding to a received inquiry response message using the first temporary BD_ADDR.

7. The apparatus of claim 6, wherein the controller generates and sets a second temporary BD_ADDR, if a detection request for adjacent Bluetooth devices is requested from the user in the secured mode, and releases and eliminates the second temporary BD_ADDR and sets the default BD_ADDR, when the Bluetooth communication is terminated, and wherein the Bluetooth module broadcasts an inquiry message including the second temporary BD_ADDR and performs the Bluetooth communication with a Bluetooth device selected by the user from among Bluetooth devices corresponding to a received inquiry response message using the second temporary BD_ADDR.

8. The apparatus of claim 6, wherein if a plurality of Bluetooth devices perform Bluetooth communications with the Bluetooth device using the first temporary BD_ADDR, the controller releases and eliminates the first temporary BD_ADDR and sets the default BD_ADDR after all the Bluetooth communications with the plurality of Bluetooth devices are terminated.

9. The apparatus of claim 7, wherein if a plurality of Bluetooth devices perform Bluetooth communications with the Bluetooth device using the second temporary BD_ADDR, the controller releases and eliminates the second temporary BD_ADDR and sets the default BD_ADDR after all the Bluetooth communications with the plurality of Bluetooth devices are terminated.

10. The apparatus of claim 6, wherein the default BD_ADDR is a unique address assigned to the Bluetooth device.

* * * * *